United States Patent [19]
Jester

[11] Patent Number: 5,836,518
[45] Date of Patent: Nov. 17, 1998

[54] FERTILIZER SPRINKLER SYSTEM

[76] Inventor: Shelby D. Jester, 2553 Studebaker Rd., Long Beach, Calif. 90815

[21] Appl. No.: 820,990

[22] Filed: Mar. 19, 1997

[51] Int. Cl.[6] ........................................................ B01F 1/00
[52] U.S. Cl. .............................................................. 239/310
[58] Field of Search .................................... 239/201, 208, 239/209, 10, 310

[56] References Cited

U.S. PATENT DOCUMENTS

| | | | |
|---|---|---|---|
| 3,351,290 | 11/1967 | Baldwin | 239/201 X |
| 3,833,177 | 9/1974 | Pasley et al. | 239/201 |
| 3,901,262 | 8/1975 | Gutkowski | 239/310 |
| 4,385,034 | 5/1983 | Gacer | 239/10 X |
| 4,852,802 | 8/1989 | Iggulden et al. | 239/69 X |
| 5,020,939 | 6/1991 | Tsuruta | 405/36 |
| 5,196,125 | 3/1993 | O'Brien | 239/201 |
| 5,333,785 | 8/1994 | Dodds et al. | 239/69 |
| 5,364,030 | 11/1994 | Murdock et al. | 239/310 |
| 5,413,280 | 5/1995 | Taylor | 239/10 |

*Primary Examiner*—Kevin Weldon

[57] ABSTRACT

A fertilizer sprinkler system including a pipe system adapted for flow of liquid therethrough. The pipe system is comprised of an open inboard portion, a closed outboard portion and an intermediate portion. The inboard portion is coupled to a main water line. The intermediate portion is defined by a first vertical member, a horizontal member and a second vertical member. The intermediate portion further has a lower horizontal member having a first end in fluid communication with the first vertical member and a second end in fluid communication with the second vertical member. The lower horizontal member has an intermediate segment having an integral lid extending downwardly therefrom. The lid has an inlet port and an outlet port therethrough. A fertilizer container removably couples with the lid of the pipe system. A plurality of outlet valves are positioned within the outboard portion of the pipe system. The plurality of outlet valves are adapted for coupling with sprinklers.

8 Claims, 3 Drawing Sheets

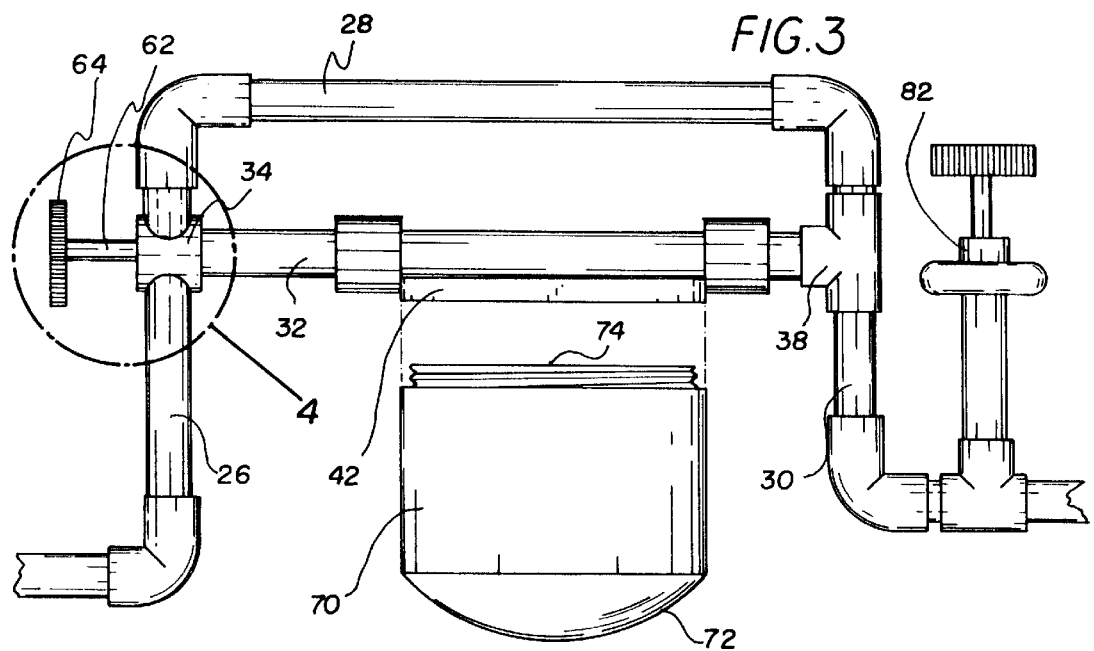
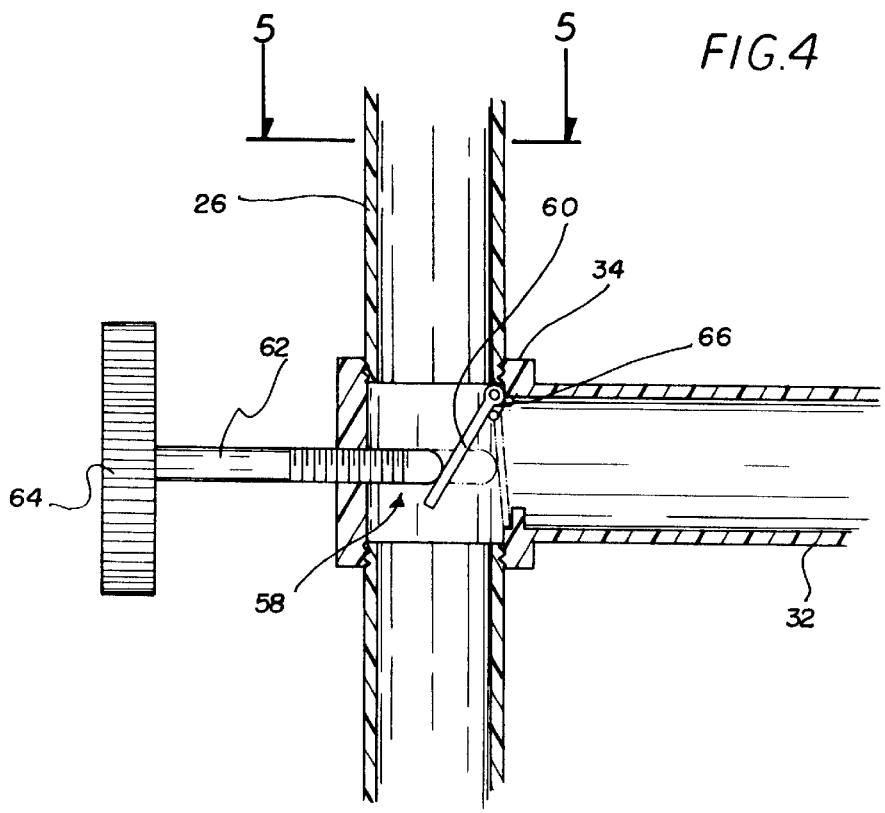

FERTILIZER SPRINKLER SYSTEM

BACKGROUND OF THE INVENTION

1. Field of the Invention

The present invention relates to a fertilizer sprinkler system and more particularly pertains to distributing fertilizer mixed with water over a lawn and plants with a fertilizer sprinkler system.

2. Description of the Prior Art

The use of fertilizer dispensers is known in the prior art. More specifically, fertilizer dispensers heretofore devised and utilized for the purpose of spreading fertilizer are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,303,729 to DeMarco discloses a lawn care chemical delivery device.

U.S. Pat. No. 5,005,601 to Strong discloses an automatic proportioning fertilizer injector.

U.S. Pat. No. 4,870,991 to McMillan et al. discloses a lawn sprinkler fertilizer device.

U.S. Pat. No. 4,883,086 to Lejnar discloses an aspiration chemical supply apparatus and method.

U.S. Pat. No. 4,768,712 to Terrell discloses a selective blending and dispensing system and apparatus for liquid fertilizers on golf courses.

U.S. Pat. No. 4,456,176 to Agius discloses an apparatus for processing and dispensing fertilizer or insecticide.

While these devices fulfill their respective, particular objective and requirements, the aforementioned patents do not describe a fertilizer sprinkler system for distributing fertilizer mixed with water over a lawn and plants.

In this respect, the fertilizer sprinkler system according to the present invention substantially departs from the conventional concepts and designs of the prior art, and in doing so provides an apparatus primarily developed for the purpose of distributing fertilizer mixed with water over a lawn and plants.

Therefore, it can be appreciated that there exists a continuing need for new and improved fertilizer sprinkler system which can be used for distributing fertilizer mixed with water over a lawn and plants. In this regard, the present invention substantially fulfills this need.

SUMMARY OF THE INVENTION

In the view of the foregoing disadvantages inherent in the known types of fertilizer dispensers now present in the prior art, the present invention provides an improved fertilizer sprinkler system. As such, the general purpose of the present invention, which will be described subsequently in greater detail, is to provide a new and improved fertilizer sprinkler system and method which has all the advantages of the prior art and none of the disadvantages.

To attain this, the present invention essentially comprises a pipe system adapted for flow of liquid therethrough. The pipe system is comprised of an inboard portion, an outboard portion and an intermediate portion. The inboard portion has a generally inverted U-shaped configuration. The inboard portion has an exterior end and an interior end. The exterior end is couplable to a main water line. The intermediate portion has a generally inverted U-shaped configuration. The intermediate portion has an inner end and an outer end. The inner end is coupled with the interior end of the inboard portion. The intermediate portion is further defined by a first vertical member in communication with its exterior end, a horizontal member and a second vertical member in communication with its interior end. The intermediate portion further has a lower horizontal member having a first end in fluid communication with the first vertical member and a second end in fluid communication with the second vertical member. The lower horizontal member has an intermediate segment of a reduced diameter. The intermediate segment has an integral internally threaded lid extending downwardly therefrom. The lid has an inlet port and an outlet port therethrough. The outboard portion has an interior end coupled with the outer end of the intermediate portion. The outboard portion has a closed exterior end. A control valve is positioned within the inboard portion of the pipe system inwardly of the exterior thereof. An anti-backflow valve is positioned within the inboard portion of the pipe system inwardly of the control valve. A flow direction valve is positioned within the first vertical member and the first end of the lower horizontal member. The flow direction valve includes a spring-biased flap having a first orientation biased to preclude flow of fluid within the lower horizontal member and a second orientation to allow flow of fluid within the lower horizontal member. The flow direction valve has a rod secured to a rear surface of the flap and extends outwardly of the first vertical member. A handle is secured to the rod to facilitate manipulation of the flap. The system includes a fertilizer container having an arcuate closed lower end and an externally threaded upper end. The upper end removably couples with the lid of the pipe system. A dividing wall is secured to and extends downwardly from the lid of the pipe system. The dividing wall is dimensioned for positioning within the fertilizer container when coupled to the lid. A plurality of outlet valves are positioned within the outboard portion of the pipe system. The plurality of outlet valves are adapted for coupling with sprinklers.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved fertilizer sprinkler system which has all the advantages of the prior art fertilizer dispensers and none of the disadvantages.

It is another object of the present invention to provide a new and improved fertilizer sprinkler system which may be easily and efficiently manufactured and marketed.

It is a further object of the present invention to provide a new and improved fertilizer sprinkler system which is of durable and reliable construction.

An even further object of the present invention is to provide a new and improved fertilizer sprinkler system which is susceptible of a low cost of manufacture with regard to both materials and labor, and which accordingly is then susceptible of low prices of sale to the consuming public, thereby making such a fertilizer sprinkler system economically available to the buying public.

Even still another object of the present invention is to provide a new and improved fertilizer sprinkler system for distributing fertilizer mixed with water over a lawn and plants.

Lastly, it is an object of the present invention to provide a new and improved fertilizer sprinkler system including a pipe system adapted for flow of liquid therethrough. The pipe system is comprised of an open inboard portion, a closed outboard portion and an intermediate portion. The inboard portion is coupled to a main water line. The intermediate portion is defined by a first vertical member, a horizontal member and a second vertical member. The intermediate portion further has a lower horizontal member having a first end in fluid communication with the first vertical member and a second end in fluid communication with the second vertical member. The lower horizontal member has an intermediate segment having an integral lid extending downwardly therefrom. The lid has an inlet port and an outlet port therethrough. A fertilizer container removably couples with the lid of the pipe system. A plurality of outlet valves are positioned within the outboard portion of the pipe system. The plurality of outlet valves are adapted for coupling with sprinklers.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a front elevation view of the fertilizer mixer as coupled with the pipe system.

FIG. 4 is a cross-sectional view of the flow direction valve as taken from circle 4 of FIG. 3.

The same reference numerals refer to the same parts through the various figures.

DESCRIPTION OF THE PREFERRED EMBODIMENT

Figure 1:
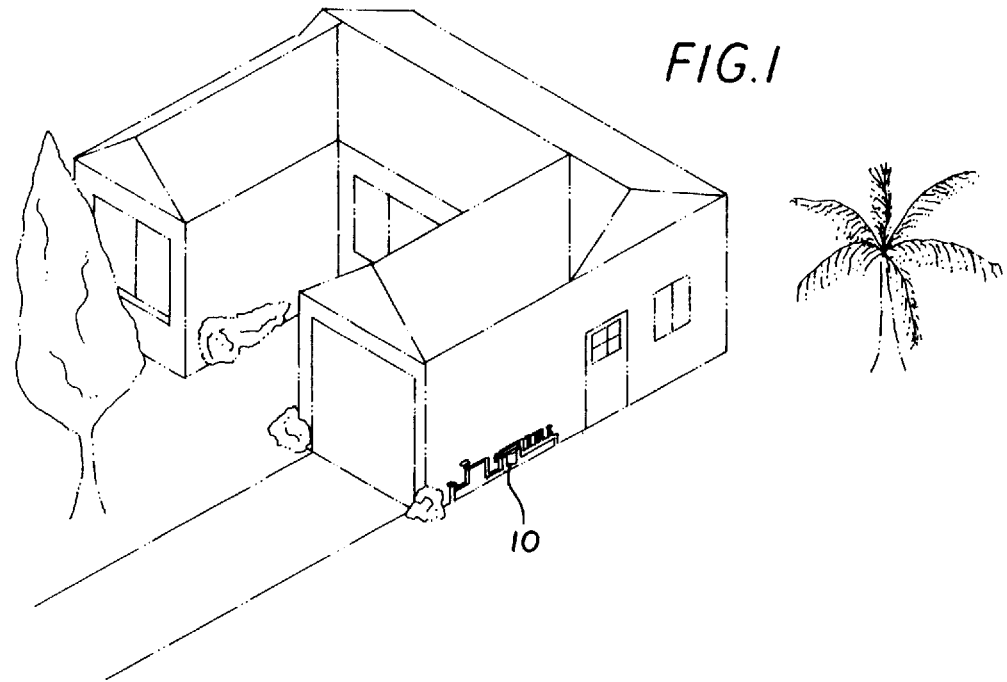
FIG. 1 is a perspective view of the preferred embodiment of the fertilizer sprinkler system constructed in accordance with the principles of the present invention.
Figure 2:
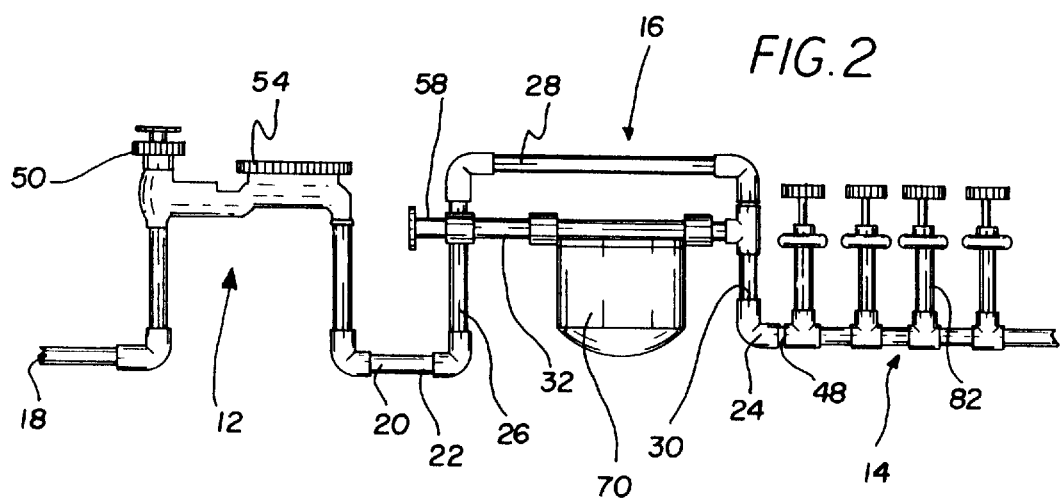
FIG. 2 is a front elevation view of the present invention.
Figure 5:
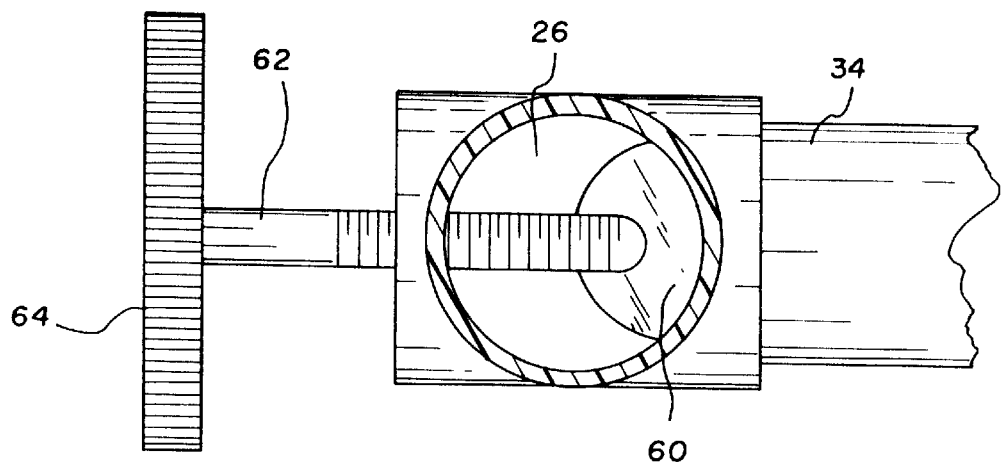
FIG. 5 is a cross-sectional view as taken along line 5—5 of FIG. 4.
Figure 6:
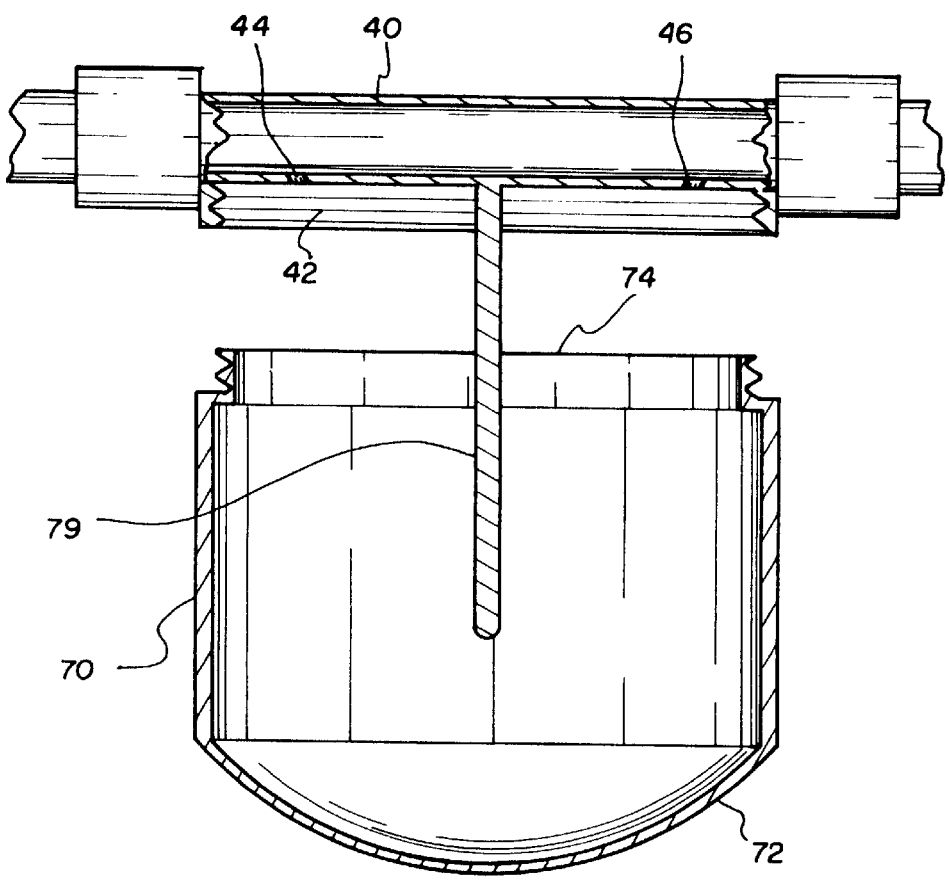
FIG. 6 is a cross-sectional view of the fertilizer mixer of the present invention as seen in FIG. 3.

With reference now to the drawings, and in particular, to FIGS. 1 through 6 thereof, the preferred embodiment of the new and improved fertilizer sprinkler system embodying the principles and concepts of the present invention and generally designated by the reference number 10 will be described.

Specifically, it will be noted in the various Figures that the device relates to a fertilizer sprinkler system for distributing fertilizer mixed with water over a lawn and plants. In its broadest context, the device consists of a pipe system, a control valve, an anti-backflow valve, a flow direction valve, a fertilizer container, a dividing wall and a plurality of outlet valves. Such components are individually configured and correlated with respect to each other so as to attain the desired objective.

The system 10 is essentially a pipe system adapted for flow of liquid therethrough. The pipe system is comprised of an inboard portion 12, an outboard portion 14 and an intermediate portion 16. The inboard portion 12 has a generally inverted U-shaped configuration. The inboard portion 12 has an exterior end 18 and an interior end 20. The exterior end 18 is couplable to a main water line. The intermediate portion 16 has a generally inverted U-shaped configuration. The intermediate portion 16 has an inner end 22 and an outer end 24. The inner end 22 is coupled with the interior end 20 of the inboard portion 12. The intermediate portion 16 is further defined by a first vertical member 26 in communication with its exterior end 22, a horizontal member 28 and a second vertical member 30 in communication with its interior end 24. The intermediate portion 16 further has a lower horizontal member 32 having a first end 34 in fluid communication with the first vertical member 26 and a second end 38 in fluid communication with the second vertical member 30. The lower horizontal member 32 has an intermediate segment 40 of a reduced diameter. The intermediate segment 40 has an integral internally threaded lid 42 extending downwardly therefrom. The lid 42 has an inlet port 44 and an outlet port 46 therethrough. The outboard portion 14 has an interior end 48 coupled with the outer end 24 of the intermediate portion 16. The outboard portion 14 has a closed exterior end. The pipe system is adapted to allow for the flow of fluids freely from the inboard end through the intermediate portion to the outboard portion.

A control valve 50 is positioned within the inboard portion 12 of the pipe system inwardly of the exterior thereof. The control valve 50 is rotatable so as to allow the water from the main water line.

An anti-backflow valve 54 is positioned within the inboard portion 12 of the pipe system inwardly of the control valve 54. The anti-backflow valve 54 serves to prevent the rearward flow of fertilized water into the main water line.

A flow direction valve 58 is positioned within the first vertical member 26 and the first end 34 of the lower horizontal member 32. The flow direction valve 58 includes a spring-biased flap 60 having a first orientation biased to preclude flow of fluid within the lower horizontal member 32 and a second orientation to allow-flow of fluid within the lower horizontal member 32. The second flow of orientation is illustrated in FIG. 4. The first flow of orientation allows the water to flow through the horizontal member 28. The flow direction valve 58 has a rod 62 secured to a rear surface of the flap 60 and extends outwardly of the first vertical member 26. A handle 64 is secured to the rod 62 to facilitate manipulation of the flap 60. A spring 66 is situated on a radial edge of the flap 60 to bias the flap in the first orientation to essentially plug the first end 34 of the lower horizontal member. By pulling outwardly on the handle, the flap 60 is pulled away thereby exposing the first end to allow for the flow of water through the lower horizontal member. Release of the handle will cause the spring 66 to urge the flap to its first orientation.

The system 10 includes a fertilizer container 70 having an arcuate closed lower end 72 and an externally threaded upper end 74. The upper end 74 removably couples with the lid 42 of the pipe system. The container 70 is used to hold a fertilizer therein for mixing with water. The flow of water through the lower horizontal member 32 will allow water to enter into the container 70 through the inlet port 44 whereby the water and fertilizer will mix and reach a level to which the mixture of water and fertilizer will dispense through the outlet port 46 to flow through the rest of the pipe system.

A dividing wall 78 is secured to and extends downwardly from the lid 42 of the pipe system. The dividing wall 78 is dimensioned for positioning within the fertilizer container 70 when coupled to the lid 42. The dividing wall 78 serves as a mixer for the fertilizer and water. As water enters into the container via the inlet port, the water will swirl around the dividing wall 78 thereby mixing with the fertilizer to be dispensed through the outlet port 46. Note FIG. 6.

A plurality of outlet valves 82 are positioned within the outboard portion 14 of the pipe system. The plurality of outlet valves 82 are adapted for coupling with sprinklers for the distribution of the fertilized water over plants or a lawn.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A fertilizer sprinkler system for distributing fertilizer mixed with water over a lawn and plants comprising, in combination:

a pipe system adapted for flow of liquid therethrough, the pipe system comprised of an inboard portion, a outboard portion and an intermediate portion, the inboard portion coupled to a main water line, the intermediate portion being defined by a first vertical member, a horizontal member and a second vertical member, the intermediate portion further having a lower horizontal member having a first end in fluid communication with the first vertical member and a second end in fluid communication with the second vertical member, the lower horizontal member having an intermediate segment having an integral lid extending downwardly therefrom, the lid having an inlet port and an outlet port therethrough;

a fertilizer container removably coupling with the lid of the pipe system;

a plurality of outlet valves positioned within the outboard portion of the pipe system, the plurality of outlet valves adapted for coupling with sprinklers;

a dividing wall secured to and extending downwardly from the lid of the pipe system, the dividing wall positioned within the fertilizer container when coupled to the lid.

2. A fertilizer sprinkler system for distributing fertilizer mixed with water over a lawn and plants comprising, in combination:

a pipe system adapted for flow of liquid therethrough, the pipe system comprised of an inboard portion, a outboard portion and an intermediate portion, the inboard portion coupled to a main water line, the intermediate portion being defined by a first vertical member, a horizontal member and a second vertical member, the intermediate portion further having a lower horizontal member having a first end in fluid communication with the first vertical member and a second end in fluid communication with the second vertical member, the lower horizontal member having an intermediate segment having an integral lid extending downwardly therefrom, the lid having an inlet port and an outlet port therethrough;

a fertilizer container removably coupling with the lid of the pipe system;

a plurality of outlet valves positioned within the outboard portion of the pipe system, the plurality of outlet valves adapted for coupling with sprinklers;

a flow direction valve positioned within the first vertical member and the lower horizontal member; and wherein the flow direction valve including a spring-biased flap having a first orientation biased to preclude flow of fluid within the lower horizontal member and a second orientation to allow flow of fluid within the lower horizontal member.

3. The system as set forth in claim 2 and further including a control valve positioned within the inboard portion of the pipe system inwardly of an exterior thereof.

4. The system as set forth in claim 2 and further including an anti-backflow valve positioned within the inboard portion of the pipe system.

5. The system as set forth in claim 2 wherein the flow direction valve having a rod secured to a rear surface of the flap and extending outwardly of the first vertical member.

6. The system as set forth in claim 5 and further including a handle secured to the rod to facilitate manipulation of the flap.

7. The system as set forth in claim 2 and further including a dividing wall secured to and extending downwardly from the lid of the pipe system, the dividing wall positioned within the fertilizer container when coupled to the lid.

8. A fertilizer sprinkler system for distributing fertilizer mixed with water over a lawn and plants comprising, in combination:

a generally inverted U-shaped pipe system positioned between an existing inlet and outlet of an existing sprinkler system, the pipe system being further defined by a first vertical member in fluid communication with the existing sprinkler system, a horizontal member and a second vertical member in fluid communication with the existing sprinkler system, the pipe system further having a lower horizontal member having a first end in fluid communication with the first vertical member and a second end in fluid communication with the second vertical member, the lower horizontal member having an intermediate segment of a reduced diameter, the intermediate segment having an integral internally threaded lid extending downwardly therefrom, the lid having an inlet port and an outlet port therethrough;

a flow direction valve positioned within the first vertical member and the first end of the lower horizontal member, the flow direction valve including a spring-biased flap having a first orientation biased to preclude flow of fluid within the lower horizontal member and a second orientation to allow flow of fluid within the lower horizontal member, the flow direction valve having a rod secured to a rear surface of the flap and extending outwardly of the first vertical member, a handle secured to the rod to facilitate manipulation of the flap;

a fertilizer container having an arcuate closed lower end and an externally threaded upper end, the upper end removably coupling with the lid of the pipe system;

a dividing wall secured to and extending downwardly from the lid of the pipe system, the dividing wall positioned within the fertilizer container when coupled to the lid.

\* \* \* \* \*